(12) United States Patent
Takijiri et al.

(10) Patent No.: US 9,823,667 B2
(45) Date of Patent: Nov. 21, 2017

(54) FLOW RATE CONTROL APPARATUS, STORAGE MEDIUM STORING PROGRAM FOR FLOW RATE CONTROL APPARATUS AND FLOW RATE CONTROL METHOD

(71) Applicant: HORIBA STEC, Co., Ltd., Kyoto-shi, Kyoto (JP)

(72) Inventors: Kotaro Takijiri, Kyoto (JP); Yuki Tanaka, Kyoto (JP); Atsushi Ieki, Kyoto (JP)

(73) Assignee: HORIBA STEC, Co., Ltd., Kyoto-shi, Kyoto (JP)

( * ) Notice: Subject to any disclaimer, the term of this patent is extended or adjusted under 35 U.S.C. 154(b) by 18 days.

(21) Appl. No.: 14/814,340

(22) Filed: Jul. 30, 2015

(65) Prior Publication Data

US 2016/0033973 A1 Feb. 4, 2016

(30) Foreign Application Priority Data

Aug. 1, 2014 (JP) .................................. 2014-158114

(51) Int. Cl.
*G05D 7/06* (2006.01)

(52) U.S. Cl.
CPC ...... *G05D 7/0635* (2013.01); *Y10T 137/7761* (2015.04)

(58) Field of Classification Search
CPC .................... G05D 7/0635; Y10T 137/7761
USPC ...................................................... 137/487.5
See application file for complete search history.

(56) References Cited

U.S. PATENT DOCUMENTS

| | | | | | |
|---|---|---|---|---|---|
| 4,230,299 | A | * | 10/1980 | Pierce, Jr. | E21B 34/02 137/315.28 |
| 4,687,020 | A | * | 8/1987 | Doyle | G05D 7/0635 137/486 |
| 4,702,277 | A | * | 10/1987 | Ollivier | F17C 13/04 137/495 |
| 4,706,929 | A | * | 11/1987 | Kalaskie | F16K 1/305 137/316 |
| 4,815,692 | A | * | 3/1989 | Loiseau | F16K 1/302 251/14 |
| 4,819,682 | A | * | 4/1989 | Van Marcke | F16K 31/404 137/1 |
| 5,062,446 | A | * | 11/1991 | Anderson | G05D 7/0635 137/468 |

(Continued)

FOREIGN PATENT DOCUMENTS

JP 2011204265 A 10/2011

*Primary Examiner* — William McCalister
(74) *Attorney, Agent, or Firm* — Alleman Hall Creasman & Tuttle LLP

(57) ABSTRACT

In order to keep a stable flow rate at a set flow rate value when a pressure fluctuation occurs in an upstream side of a valve, without providing an additional sensor for detecting a pressure fluctuation, a flow rate control apparatus is provided with: the valve; a flow rate sensor; a valve control part configured to control the valve so that a deviation between a set flow rate value and a measurement flow rate value is reduced, on the basis of the deviation and a set control coefficient; and a control coefficient setting part configured to set the control coefficient so that when a pressure rise occurs in the upstream side of the valve, a decreased amount in flow due to a decreased opening of the valve and an increased amount in flow due to an increased amount of a differential pressure before and after the valve, are balanced.

7 Claims, 8 Drawing Sheets

(56) References Cited

U.S. PATENT DOCUMENTS

| | | | | | |
|---|---|---|---|---|---|
| 5,129,418 A | * | 7/1992 | Shimomura | | G05D 7/0635 137/486 |
| 5,141,021 A | * | 8/1992 | Shimomura | | G01F 1/6847 137/486 |
| 5,293,778 A | * | 3/1994 | Schneiter | | G05D 7/0676 73/112.01 |
| 5,303,731 A | * | 4/1994 | Vavra | | G01F 1/50 137/468 |
| 5,439,026 A | * | 8/1995 | Moriya | | G05D 7/0635 137/486 |
| 5,524,084 A | * | 6/1996 | Wang | | G01F 1/34 702/100 |
| 5,664,759 A | * | 9/1997 | Evans | | C23C 16/4401 137/614.21 |
| 5,755,424 A | * | 5/1998 | Ryd | | F16K 35/00 251/14 |
| 5,911,238 A | * | 6/1999 | Bump | | G01F 1/6842 137/486 |
| 5,925,829 A | * | 7/1999 | Laragione | | G01F 1/34 73/861 |
| 5,944,048 A | * | 8/1999 | Bump | | G01F 1/6842 137/486 |
| 5,966,499 A | * | 10/1999 | Hinkle | | B01J 4/00 118/715 |
| 5,967,186 A | * | 10/1999 | Grueninger | | F16K 31/0606 137/625.65 |
| 6,062,246 A | * | 5/2000 | Tanaka | | G05D 7/0635 137/12 |
| 6,068,016 A | * | 5/2000 | Manofsky, Jr. | | C23C 16/4408 137/269 |
| 6,089,531 A | * | 7/2000 | Young | | F16K 31/1262 251/285 |
| 6,119,710 A | * | 9/2000 | Brown | | G05D 7/06 137/14 |
| 6,138,708 A | * | 10/2000 | Waldbusser | | G05D 7/005 137/341 |
| 6,216,726 B1 | * | 4/2001 | Brown | | G01F 1/50 137/486 |
| 6,227,223 B1 | * | 5/2001 | Crochet | | F16K 27/07 105/377.07 |
| 6,269,692 B1 | * | 8/2001 | Drexel | | G01F 1/6842 137/486 |
| 6,343,617 B1 | * | 2/2002 | Tinsley | | G05D 7/0635 137/486 |
| 6,363,958 B1 | * | 4/2002 | Ollivier | | G05D 7/0647 137/2 |
| 6,425,281 B1 | * | 7/2002 | Sheriff | | G01F 15/002 137/115.22 |
| 6,591,850 B2 | * | 7/2003 | Rocha-Alvarez | | G05D 7/0635 137/101 |
| 6,601,005 B1 | * | 7/2003 | Eryurek | | G01K 15/00 374/E15.001 |
| 6,714,878 B2 | * | 3/2004 | Vyers | | G01F 1/6847 702/100 |
| 6,898,558 B2 | * | 5/2005 | Klekotka | | G05B 19/4183 156/345.24 |
| 8,127,783 B2 | * | 3/2012 | Balarabe | | F16K 7/17 137/12 |
| 8,656,953 B2 | * | 2/2014 | Mohammed | | F16K 7/17 137/596 |
| 2002/0046612 A1 | * | 4/2002 | Mudd | | G01F 1/40 73/861.52 |
| 2002/0053403 A1 | * | 5/2002 | Tsourides | | F16K 27/003 156/345.29 |
| 2002/0117212 A1 | * | 8/2002 | Vyers | | G05D 16/202 137/487.5 |
| 2002/0179149 A1 | * | 12/2002 | Ohmi | | G05D 7/0658 137/487.5 |
| 2002/0198668 A1 | * | 12/2002 | Lull | | G01F 25/0007 702/45 |
| 2003/0234039 A1 | * | 12/2003 | Shajii | | G01F 1/684 137/12 |
| 2003/0234048 A1 | * | 12/2003 | Shajii | | G01F 1/684 137/487.5 |
| 2003/0236592 A1 | * | 12/2003 | Shajii | | G01F 1/684 700/282 |
| 2003/0236638 A1 | * | 12/2003 | Shajii | | G01F 1/6847 702/45 |
| 2003/0236643 A1 | * | 12/2003 | Shajii | | G01F 1/684 702/100 |
| 2004/0074311 A1 | * | 4/2004 | Lull | | G01F 1/696 73/861 |
| 2004/0083807 A1 | * | 5/2004 | Mudd | | G01F 1/86 73/204.21 |

\* cited by examiner

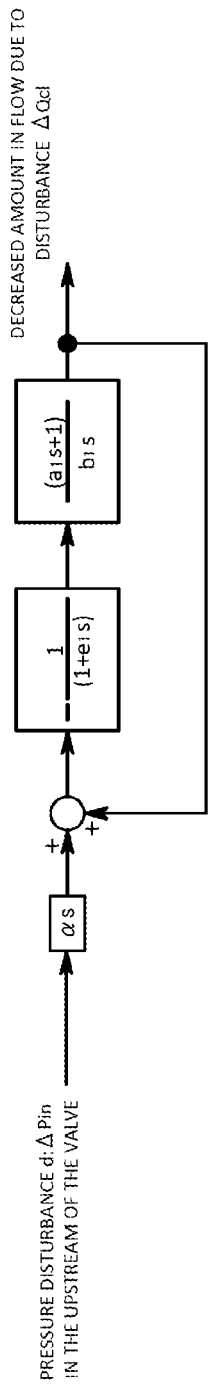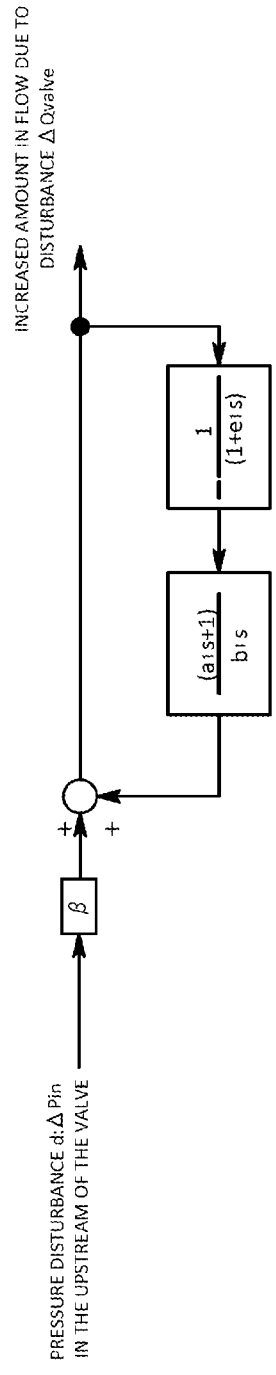
FIG. 5(a)
FIG. 5(b)

FLOW RATE CONTROL APPARATUS, STORAGE MEDIUM STORING PROGRAM FOR FLOW RATE CONTROL APPARATUS AND FLOW RATE CONTROL METHOD

TECHNICAL FIELD

The present invention relates to a flow rate control apparatus, a program storage medium storing a program for the flow rate control apparatus and a flow rate control method for use in, for example, a semiconductor manufacturing apparatus and the like.

BACKGROUND ART

As disclosed in Patent Literature 1, a flow rate control apparatus is equipped with a valve provided on a flow path, a flow rate sensor provided on an upstream side of the valve and a valve control part configured to control an opening position of the valve so that a measurement flow rate value measured by the flow rate sensor follows the set flow rate value, and an object thereof is to continuously stabilize the flow rate in a downstream side of the flow rate control apparatus.

By the way, in the case where there occurs a pressure fluctuation in a flow path in an upstream side of the valve, it becomes a disturbance in controlling. Therefore, an opening position of the valve is changed due to the control performed by the valve control part. As a result of this, the flow rate in the downstream side of the valve may deviate from the set flow rate value in some cases.

That is, despite the flow rate in the downstream side of the valve, which is a target for the flow rate desired to be actually stabilized, is preciously stable, a stable flow rate control state is impaired due to the pressure fluctuation in the upstream side of the valve where there is no problem even though the flow rate is disturbed.

In order to solve this problem, in Patent Literature 1, a pressure sensor for detecting the pressure fluctuation is previously provided in the upstream side of the valve and the flow rate sensor, and based on the pressure detected by this pressure sensor, a control coefficient such as PID system coefficient is appropriately changed and it is configured so that the flow rate in the downstream side of the valve can be kept at the set flow rate value constantly.

By the way, a cheaper version omitting the pressure sensor which is not an essential component for the flow rate control apparatus in some applications is required in some cases, and there has been a demand for stabilizing the flow rate in the downstream side of the valve with an accuracy not at all inferior to the flow rate control apparatus described in Patent Literature 1 even without the pressure sensor.

CITATION LIST

Patent Literature

Patent Literature 1: JP 2011-204265A

SUMMARY OF INVENTION

Technical Problem

The present invention has been made in consideration of the problems as described above, and an object thereof is to provide a flow rate control apparatus, a program storage medium storing a flow rate control program and a flow rate control method, capable of preventing an influence from appearing in a downstream side of a valve even in the case where a pressure fluctuation occurs in an upstream side of the valve and stably keeping a flow rate at a set flow rate value without providing an additional sensor for detecting a pressure fluctuation.

Solution to Problem

That is, the present invention has been made for the first time, as a result of the present inventors' intensive study, by finding that an influence on the flow rate in the downstream side of the valve due to a pressure fluctuation caused in the upstream side of the valve has two different mechanisms and that the directions of flow rate changes caused by the respective mechanisms are opposite to each other.

More specifically, a first aspect of the present invention is directed to a flow rate control apparatus which includes: a valve provided on a flow path where fluid flows; a flow rate sensor provided on an upstream side of the valve in the flow path; and a valve control part configured to control the valve so that a deviation is reduced based on the deviation and a control coefficient which is set, and in this configuration, the deviation is a difference between a set flow rate value and a measurement flow rate value measured by the flow rate sensor, and the control coefficient is a value which is set so that, in the case where a pressure rise due to disturbance occurs in the upstream side of the valve, a decreased amount in flow due to disturbance and an increased amount in flow due to disturbance are substantially balanced, the decreased amount in flow due to disturbance is a decreased amount of a flow rate corresponding to a decreased amount of an opening position of the valve in the case where the pressure rise due to disturbance occurs in the upstream side of the valve, and the increased amount in flow due to disturbance is an increased amount of a flow rate corresponding to an increased amount of a differential pressure before and after the valve in the case where the pressure rise due to disturbance occurs in the upstream side of the valve.

Here, each of the expressions "a pressure rise due to disturbance", "an increased amount of a measurement flow rate value", "a decreased amount of an opening position of the valve", "a decreased amount in flow due to disturbance" and "an increased amount in flow due to disturbance" can be represented by not only a positive value but also a negative value. For example, in the case where a pressure rise due to disturbance is positive, all of the other amounts can be represented by positive values, and in the case where a pressure rise due to disturbance is negative, all of the other amounts can be represented by negative values.

Further, the expression "substantially balanced" implies not only a case where the increased amount in flow due to disturbance and the decreased amount in flow due to disturbance are exactly equal but also a case where absolute values of the increased amount in flow due to disturbance and the decreased amount in flow due to disturbance are close to each other in a degree of, for example, a flow rate in the downstream side of the valve varying merely within a range of a predetermined tolerance difference with respect to a set flow rate value.

With this configuration, even if there occurs a pressure rise due to disturbance in the upstream side of the valve, it is set the control coefficient so that, the decreased amount in flow due to disturbance caused by reducing the opening position of the valve by the valve control part, and the increased amount in flow due to disturbance caused by facilitating the fluid to pass through the valve by an increment amount of a differential pressure before and after the valve by the pressure rise due to disturbance irrespective of the opening position of the valve, are balanced, and therefore, the influence of the pressure rise due to disturbance can be prevented from appearing in the downstream side of the valve and thus the flow rate in the downstream side of the valve which is a target to be actually controlled can be kept at a set flow rate value.

In other words, in the case where the present invention is considered with a control block diagram, the present invention is regarded as a feedback control system with the set flow rate as an input and the measurement flow rate value of the flow rate sensor as an output, and there exists a flow rate in the downstream side of the valve as a midway output thereof. However, by setting a transfer function from the pressure rise due to disturbance inputted in the middle of the feedback control system to the flow rate in the downstream side of the valve to be zero by setting the control coefficient, the influence of the disturbance can be prevented from appearing in the flow rate of the downstream side.

Moreover, since the influence of the pressure rise due to disturbance is prevented from being transferred to the flow rate in the downstream side of the valve as a characteristic of the control system by setting the control coefficient, it is not necessary to correspond on the control by making it possible to detect the pressure rise due to disturbance as in the conventional technics. Accordingly, a high-performance flow rate control can be realized without necessity of providing an additional sensor which is not directly used in the flow rate control for detecting the pressure rise due to disturbance while suppressing a manufacturing cost with a simple construction of the flow rate control apparatus.

For example, in a case where a reference pressure in the upstream side of the valve is largely changed or also in a flow rate control application case where the same value is not always set as the set flow rate value, in order to be able to stably keep the pressure in the downstream side of the valve to be substantially the same value as the set flow rate value by balancing the decreased amount in flow due to disturbance and the increased amount in flow due to disturbance, it is merely necessary that the flow rate control apparatus further includes a control coefficient setting part configured to set the control coefficient of the valve control part based on the pressure in the upstream side of the valve or the set flow rate value.

The present inventors have found that the increased amount in flow due to disturbance caused by changing of the differential pressure before and after the valve due to the pressure rise due to disturbance is also influenced by an amount of a flow rate of the fluid flowing in the flow path. In order to be able to balance the decreased amount in flow due to disturbance and the increased amount in flow due to disturbance to be offset also taking in consideration of the influence by an amount of such a flow rate per se, it is merely necessary that the valve control part is configured so as to control the opening position of the valve by a PID control, and the control coefficient setting part is configured so as to set a proportional gain as the control coefficient and configured so as to set the proportional gain larger as the set flow rate value is larger so that the increased amount in flow due to disturbance and the decreased amount in flow due to disturbance are substantially balanced.

In order to be able to accurately balance the decreased amount in flow due to disturbance with the increased amount in flow due to disturbance by accurately adjusting the decreased amount in flow due to disturbance based on the control coefficient, and as a result to thereby constantly keep the flow rate in the downstream side of the valve to be stabilized at the set flow rate value, it is merely necessary that the flow rate control apparatus further includes: an inflow characteristic storage part configured to store inflow characteristic data indicating a relationship between the pressure in the upstream side of the valve and an inflow of the fluid flowing into an internal volume including at least a flow path between the flow rate sensor and the valve; and a valve flow rate characteristic storage part configured to store valve flow rate characteristic data indicating a relationship between the set flow rate value and the increased amount in flow due to disturbance per a unit pressure rise amount of the pressure in the upstream side of the valve, and in this configuration, the control coefficient setting part is configured so as to set the control coefficient so that the decreased amount in flow due to disturbance, and the control coefficient and the increased amount in flow due to disturbance are balanced, wherein the decreased amount in flow due to disturbance is calculated on the basis of the inflow characteristic data, and the increased amount in flow due to disturbance is calculated on the basis of the valve flow rate characteristic data and the set flow rate value.

As a specific embodiment of the present invention, it is exemplified that the flow rate sensor is a thermal flow rate sensor.

Further, as another specific embodiment of the present invention, it is exemplified that the flow rate sensor is a pressure flow rate sensor.

In order to be able to obtain the same effect as the present invention even by an existing flow rate control apparatus, it is merely necessary to use a following storage medium in the existing flow rate control apparatus. That is, a program storage medium storing a flow rate control program for use in a flow rate control apparatus which comprises: a valve provided in a flow path where fluid flows; and a flow rate sensor provided on an upstream side of the valve in the flow path, wherein the flow rate control program permits a computer to exhibit at least following function; a valve control part configured to control the valve so that a deviation is reduced, on the basis of the deviation and a control coefficient which is set, wherein the deviation is a difference between a set flow rate value and a measurement flow rate value measured by the flow rate sensor, and the control coefficient is a value which is set so that, in the case where a pressure rise due to disturbance occurs in the upstream side of the valve, a decreased amount in flow due to disturbance and an increased amount in flow due to disturbance is substantially balanced, the decreased amount in flow due to disturbance is a decreased amount of a flow rate corresponding to a decreased amount of an opening position of the valve in the case where the pressure rise due to disturbance occurs in the upstream side of the valve, and the increased amount in flow due to disturbance is an increased amount of a flow rate corresponding to an increased amount of a differential pressure before and after the valve in the case where the pressure rise due to disturbance occurs in the upstream side of the valve.

In order to keep the flow rate in the downstream side of the valve to be stabilized at the set flow rate value without providing an additional sensor for detecting disturbance, for example, it is merely necessary to use a method of controlling a flow rate using a flow rate control apparatus which comprises: a valve provided in a flow path where fluid flows; a flow rate sensor provided on an upstream side of the valve in the flow path; and a valve control part configured to control the valve so that a deviation between a set flow rate value and a measurement flow rate value measured by the flow rate sensor is reduced, on the basis of the deviation and a control coefficient which is set, wherein the method includes; setting the control coefficient so that, in the case where a pressure rise due to disturbance occurs in the upstream side of the valve, a decreased amount in flow due to disturbance and an increased amount in flow due to disturbance are substantially balanced; the decreased amount in flow due to disturbance is a decreased amount of a flow rate corresponding to a decreased amount of an opening position of the valve in the case where the pressure rise due to disturbance occurs in the upstream side of the valve. The increased amount in flow due to disturbance is an increased amount of a flow rate corresponding to an increased amount of a differential pressure before and after the valve in the case where the pressure rise due to disturbance occurs in the upstream side of the valve.

Advantageous Effects of Invention

Thus, according to the flow rate control apparatus, the program storage medium storing a flow rate control program for use in the flow rate control apparatus and the flow rate control method of the present invention, since the control coefficient is set so as to offset the increased amount in flow due to disturbance caused in accordance with the pressure rise due to disturbance occurring in the upstream side of the valve and the decreased amount in flow due to disturbance, even if there occurs a pressure rise due to disturbance, the flow rate in the downstream side of the valve can be stably kept at a set flow rate value constantly.

BRIEF DESCRIPTION OF DRAWINGS

FIG. 5(a) and FIG. 5(b) are schematic block diagrams showing an influence of the disturbance pressure to the flow rate control apparatus in the same embodiment.

DESCRIPTION OF EMBODIMENTS

The following describes one embodiment of the present invention with reference to each of the accompanying drawings.
A flow rate control apparatus 100 of the present embodiment is a thermal mass flow controller used to continuously supply component gas and the like at a predetermined constant flow rate into a vacuum chamber of, for example, a semiconductor manufacturing apparatus.

Figure 1:
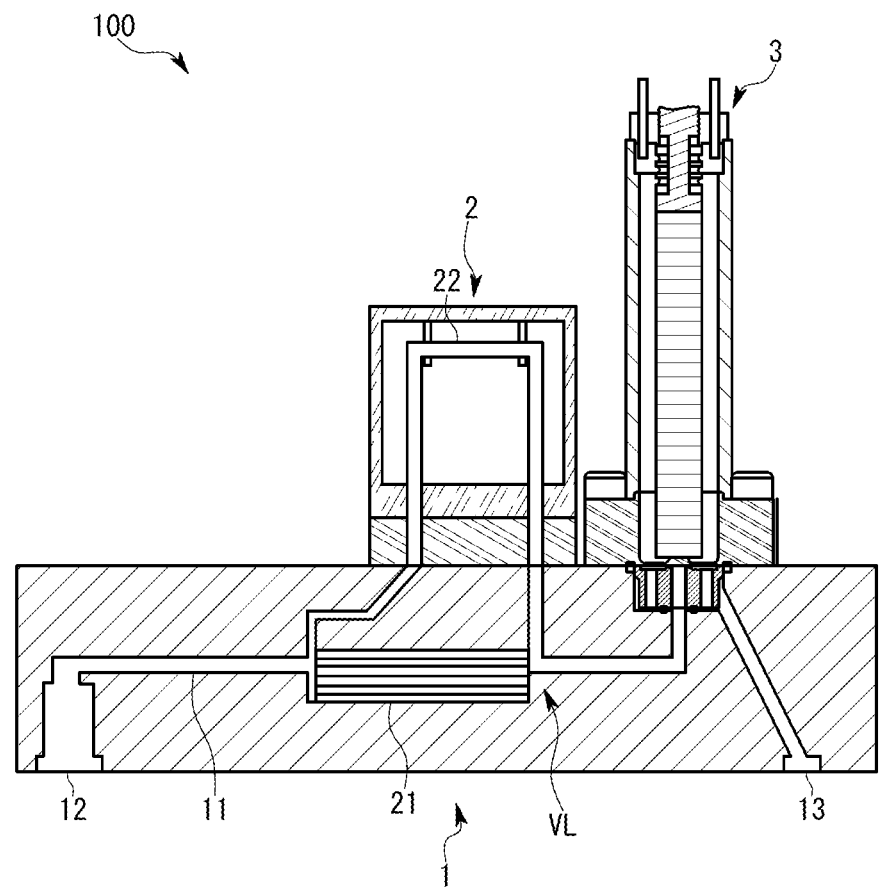
FIG. 1 is a schematic sectional view showing a configuration of a flow rate control apparatus according to one embodiment of the present invention.
Figure 2:
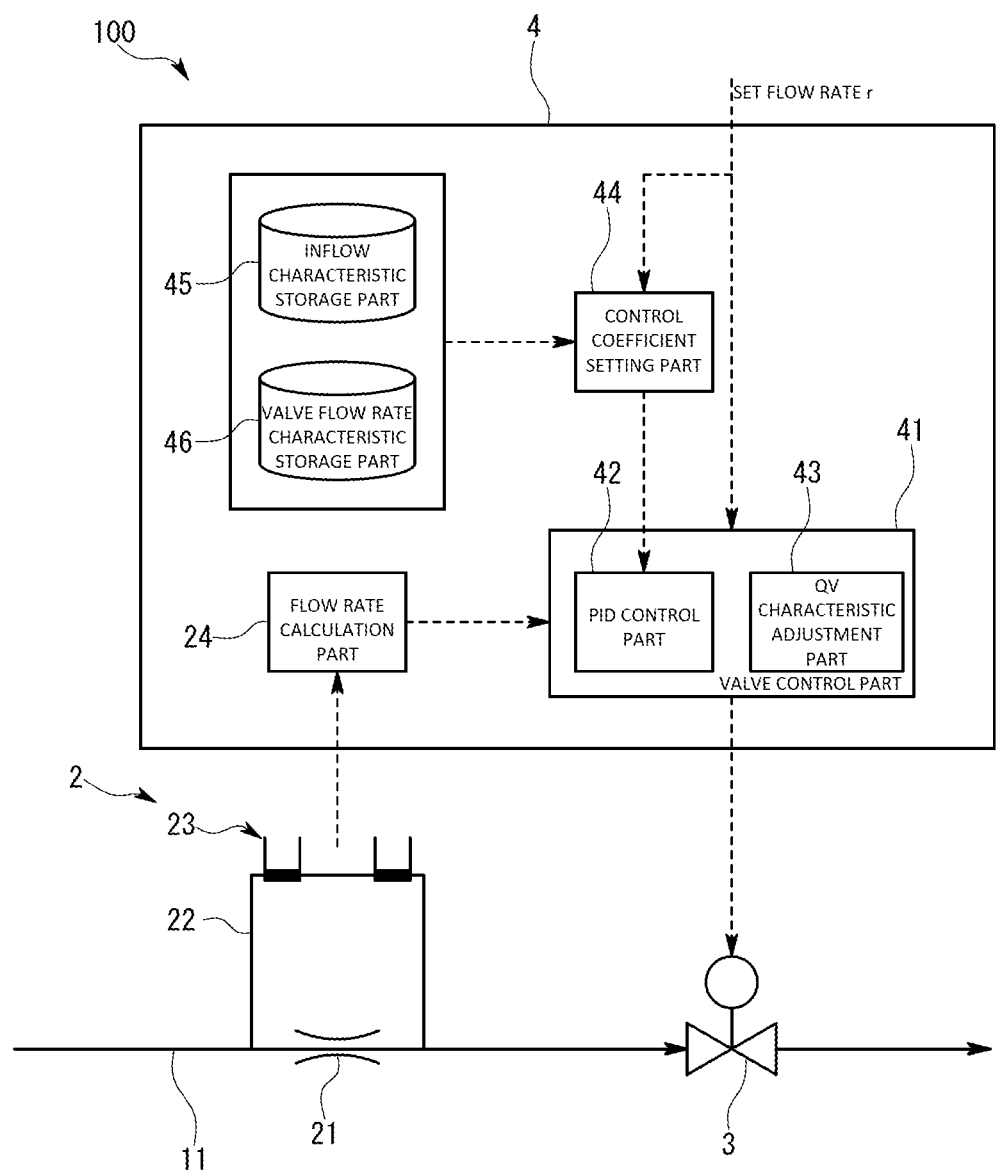
FIG. 2 is a schematic diagram showing a configuration of a program portion of the flow rate control apparatus in the same embodiment.

More specifically, as shown in FIGS. 1 and 2, the flow rate control apparatus 100 is equipped with: a body 1 of a generally parallelepiped shape having a flow path 11 formed inside thereof; a thermal flow rate sensor 2 and a valve 3 which are attached to the body 1; and a control mechanism 4 configured to control the valve 3 on the basis of an output of the flow rate sensor 2.

The body 1 is provided with an inlet 12 and an outlet 13 formed in a bottom surface thereof respectively for introducing and deriving fluid, and the flow path 11 is formed so as to connect between the inlet 12 and the outlet 13. The valve 3 is provided on the most downstream side with respect to this flow path 11 and the flow rate sensor 2 is provided on the upstream of the valve 3. Here, although the flow rate to be controlled by the flow rate control apparatus 100 is a flow rate of the fluid after derived from the outlet 13, the flow rate per se to be controlled is not measured in the present embodiment, but the opening position of the valve 3 is to be controlled on the basis of the flow rate measured at another point in the upstream of the valve 3. That is, a target flow rate to be controlled has not been directly observed but it is to be indirectly measured at another point.

The flow rate sensor 2 is configured of: a shunt element 21; a capillary 22; a detection mechanism 23; and a flow rate calculation part 24. The shunt element 21 is a fluid resistance provided in the flow path 11, and the capillary 22 is branched from the flow path 11 and it is provided so as to bypass the front and rear of the shunt element 21. The detection mechanism 23 is composed of two coils which are provided on the capillary 22 and detects a value related to the flow rate, and the flow rate calculation part 24 is configured using a calculation function of the control mechanism 4 and calculates a flow rate on the basis of the output of the detection mechanism 23. Each of the coils is an electrically heated wire and a temperature control circuit (not shown) is connected to each of the coils so that a temperature of each of the coils is kept at a predetermined temperature. A voltage value to be applied to each of the coils is outputted from the detection mechanism 23 to the flow rate calculation part 24 and the flow rate calculation part 24 calculates a flow rate on the basis of the respective voltage values.

In the present embodiment, in the case where a flow rate is varied in an internal volume VL including at least the flow path 11 from the flow rate sensor 2 to the valve 3, the flow rate sensor 2 generates an output indicating that there is a variation in flow rate even if there is no variation in flow rate in the downstream side of the valve 3. That is, an actual flow rate $Q_{out}$ after the valve which is a flow rate in the downstream side of the valve 3 is not necessarily coincident with a measurement flow rate value y which is a flow rate measured by the flow rate sensor 2.

The valve 3 is, for example, a solenoid valve or a piezo valve and an opening position (open degree) thereof is controlled in accordance with the measurement flow rate value y measured by the flow rate sensor 2. In the case where a differential pressure before and after the valve 3 is assumed to be constant, the opening position of the valve 3 substantially corresponds one-to-one to the flow rate of the fluid passing through the valve 3. Thus, the valve 3 has a valve flow rate characteristic indicating that, the larger the opening degree, the larger the flow rate passing through the valve 3 becomes.

On the other hand, in the case where the opening position of the valve 3 is assumed to be constant, the valve 3 has a valve flow rate characteristic indicating that, the larger the differential pressure before and after the valve 3, i.e., the larger the pressure in the upstream side (primary side) of the valve 3, the larger the flow rate passing through the valve 3 becomes. In this case, the valve flow rate characteristic indicates a characteristic that, the larger the opening degree and the larger the flow rate passing through the valve 3, the larger the flow rate increased in the case where the pressure in the upstream side becomes larger.

The control mechanism 4 is a so-called computer equipped with: a CPU; a memory; an A/D and D/A converter, input/output means and the like and a program for use in the flow rate control apparatus is stored in the memory. Upon execution of the program and cooperation of the equipment, the control mechanism 4 is configured so as to exhibit functions as at least the flow rate calculation part 24, a valve control part 41, a control coefficient setting part 44, an inflow characteristic storage part 45 and a valve flow rate characteristic storage part 46.

Each part will be described below.

The flow rate calculation part 24 calculates a flow rate of the fluid flowing in the flow path 11 formed inside the body 1 on the basis of the output of the detection mechanism 23, and the calculated flow rate as the measurement flow rate vale y is outputted to the valve control part 41.

As shown in FIG. 2, the valve control part 41 controls the opening position of the valve 3 so that a deviation between a set flow rate value r and the measurement flow rate value y measured by the flow rate sensor 2 is reduced on the basis of the deviation and a set control coefficient. More specifically, the valve control part 41 is configured so as to exhibit a function as a controller configured to control a control target composed of the valve 3 and the flow rate sensor 2 in a feedback system having the set flow rate value r as an input thereof and the measurement flow rate value y measured by the flow rate sensor 2 as an output thereof, as shown in a control block diagrams of FIG. 3(a) and FIG. 3(b). As described above, in the flow rate control apparatus 100 of the present embodiment, the measurement flow rate value y which is the output of the feedback system is not coincident with the actual flow rate $Q_{out}$ after the valve 3 which is a flow rate actually desired to be kept at the set flow rate value r, and the flow rate in the downstream side of the valve 3 is represented as a value outputted after the block of the valve 3 in the control block diagrams of FIG. 3(a) and FIG. 3(b).

Figure 3A:
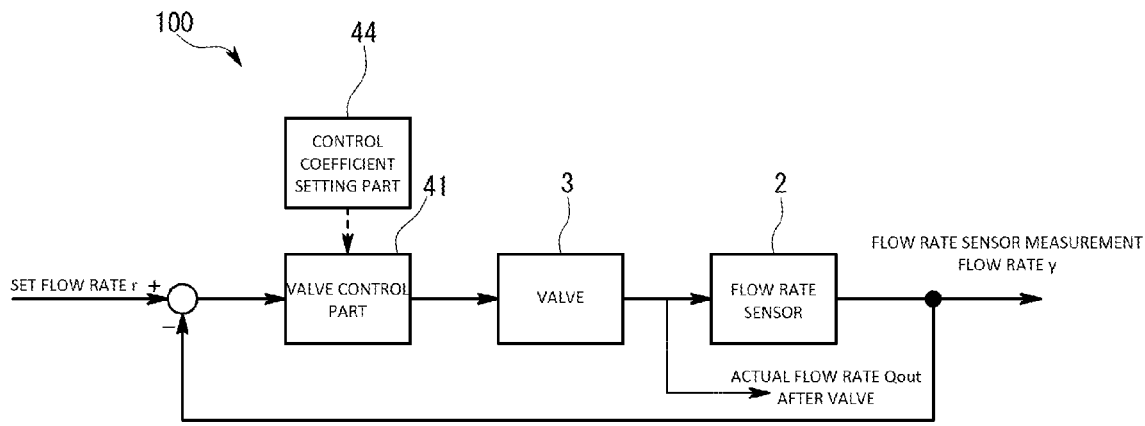
FIG. 3(a) and FIG. 3(b) are schematic block diagrams showing a control structure of the flow rate control apparatus in the same embodiment.
Figure 3B:
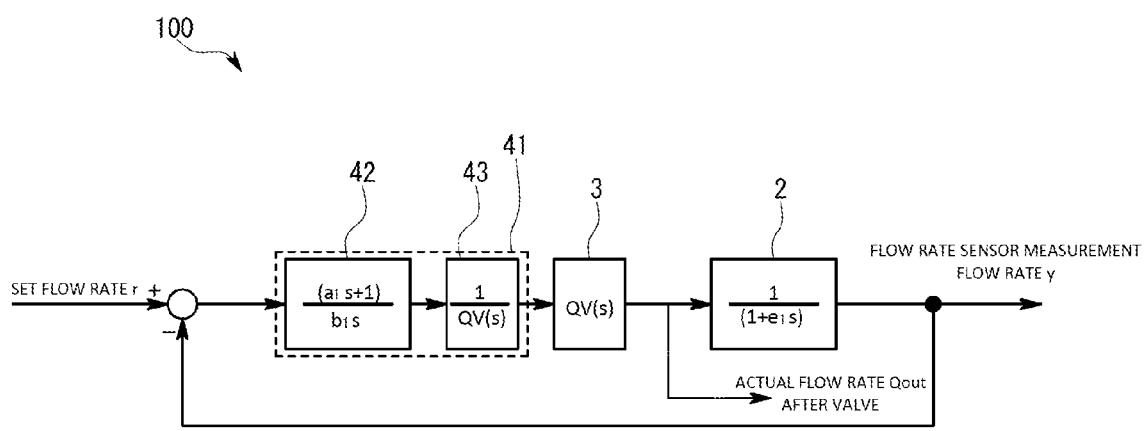

As shown in the schematic diagram of FIG. 2 and the control block diagrams of FIG. 3(a) and FIG. 3(b), the valve control part 41 of the present embodiment is configured of a PID control part 42 executing a PID calculation for the flow rate control and a QV characteristic adjustment part 43 for keeping the control characteristic of the valve 3 to be substantially constant regardless of the flow rate and pressure of the fluid flowing in the valve 3.

The PID control part 42 executes a PID calculation to the deviation between the set flow rate value r to be inputted and the measurement flow rate value y to thereby output a voltage to be applied to the valve 3. In the present embodiment, a proportional gain which is a control coefficient for use in the PID control part 42 is set by the control coefficient setting part 44. Note that, in order to simplify the explanation in each of the drawings used for explaining the present embodiment, there is shown a case where a differential coefficient of a differential term is zero. It is needless to say that the present invention can exhibit the same effect also in the case where the differential coefficient is not zero.

As shown in FIG. 3(a), the QV characteristic adjustment part 43 stands in a relationship of an inverse function with respect to a transfer function of the valve 3. That is, when considering as a control block, only the PID control part 42 and a first-order lag element indicating a characteristic of the flow rate sensor 2 remain in the control loop as shown in FIG. 3(b). More specifically, a QV characteristic which indicates a relationship between the flow rate and the applied voltage (opening position) which is a characteristic when controlling the flow rate of the valve 3 is varied under the influence of the flow rate and pressure of the fluid. In the present embodiment, the QV characteristic adjustment part 43 constitutes a reverse characteristic map with respect to the QV characteristic of the valve 3 so as to obtain a similar QV characteristic also under other conditions using the QV characteristic of the valve 3 in the case of the predetermined set flow rate value r and the pressure as a reference.

The control coefficient setting part 44 sets a control coefficient for use in the valve control part 41 so that the actual flow rate $Q_{out}$ after the valve which is the flow rate in the downstream side of the valve 3 does not deviate from the set flow rate value r even though there occurs a pressure fluctuation in the upstream of the valve 3. That is, the control coefficient setting part 44 sets the control coefficient of the valve control part 41 so that the decreased amount in flow due to disturbance $\Delta Q_{cl}$ and the increased amount in flow due to disturbance $\Delta Q_{valve}$ are balanced in the case where there occurs a pressure rise due to disturbance $\Delta P_{in}$ in the upstream side of the valve 3.

The following describes an influence on the flow rate control in the case where there occurs a pressure fluctuation in the upstream side of the valve 3 in a state that the actual flow rate $Q_{out}$ after the valve is stable at the set flow rate value r and explains what control coefficient is set by the control coefficient setting part 44. Note that, in the present embodiment, although the terms "pressure rise due to disturbance $\Delta P_{in}$", "decreased amount in flow due to disturbance $\Delta Q_{cl}$" and "increased amount in flow due to disturbance $\Delta Q_{valve}$" are defined for easy understanding, these terms may be either positive or negative values. However, the codes representing the negative or positive amount are always common. Further, in the present embodiment, the pressure in the upstream of the valve 3 is usually kept substantially constant at a reference pressure $P_{base}$, but in the case where there occurs a pressure rise due to disturbance by some disturbance, the pressure may be varied to $P_{base} + \Delta P_{in}$.

Figure 4A:
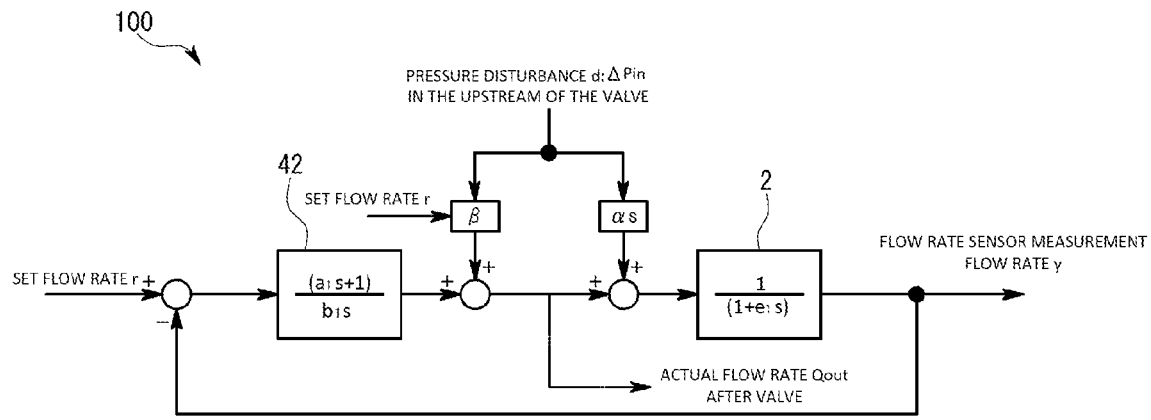
FIG. 4(a), FIG. 4(b) and FIG. 4(c) are schematic diagrams showing a control concept to a disturbance pressure of the flow rate control apparatus in the same embodiment.

FIG. 4(a) shows a control block diagram in the case of modeling not only the flow rate control apparatus 100 of the present embodiment but also the disturbance such as a pressure fluctuation in the upstream side of the valve 3. As shown in FIG. 4(a), the pressure fluctuation in the upstream of the valve 3 affects at least two types of disturbance influences on the feedback control system.

Figure 4B:
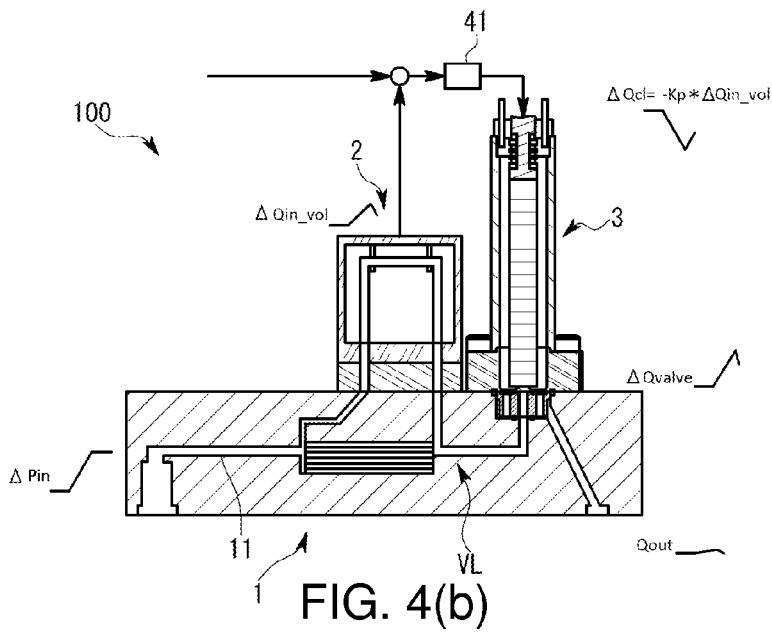

As shown in FIG. 4(b), one of the disturbance influences is that the flow rate of the fluid flowing into the internal volume VL (dead volume) including at least the flow path 11 between the flow rate sensor 2 and the valve 3 is increased by the pressure rise due to disturbance $\Delta P_{in}$ and this results in causing deviation between the measurement flow rate value y measured by the flow rate sensor 2 and the actual flow rate $Q_{out}$ after the valve. In this case, the valve control part 41 controls the valve 3 so as to reduce the opening position of the valve 3 in accordance with the increment amount $\Delta Q_{in\_vol}$ of the measurement flow rate value y. Therefore, this results in that, if there is no other influence, the decreased amount in flow due to disturbance $\Delta Q_{cl}$ corresponding to the decreased amount of the opening position of the valve 3 appears in the actual flow rate $Q_{out}$ after the valve.

The other disturbance influence is that the differential pressure before and after the valve 3 is increased due to the pressure rise due to disturbance $\Delta P_{in}$ and the flow rate characteristic per se of the valve 3 is changed that the fluid tends to easily pass through the valve 3. In this case, since the flow rate passing through the valve 3 is increased due to the change of the flow rate characteristic even though the valve has the same the opening position, this results in that, if there is no other influence, the increased amount in flow due to disturbance $\Delta Q_{valve}$ corresponding to the increment amount of the differential pressure appears in the actual flow rate $Q_{out}$ after the valve.

Figure 4C:
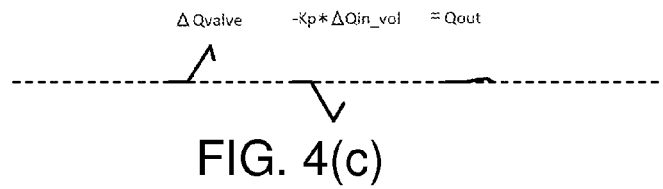

In the present embodiment, by quantifying the decreased amount in flow due to disturbance $\Delta Q_{cl}$ and the increased amount in flow due to disturbance $\Delta Q_{valve}$ caused by the pressure rise due to disturbance $\Delta P_{in}$ and setting the control coefficient so that these decreased amount in flow due to disturbance $\Delta Q_{cl}$ and increased amount in flow due to disturbance $\Delta Q_{valve}$ are substantially equal as shown in FIG. 4(c), this results in that the actual flow rate $Q_{out}$ after the valve is allowed to be kept at the set flow rate value r without being influenced by the pressure rise due to disturbance $\Delta P_{in}$. The following quantitatively describes each of the amounts.

Since the increment amount $\Delta Q_{in\_vol}$ of the flow rate of the fluid flowing into the internal volume VL caused by the pressure rise due to disturbance is proportional to the time derivative of the pressure rise due to disturbance $\Delta P_{in}$, the transfer function can be expressed as Equation 1.

[Equation 1]

$$Q_{in\_vol} = \alpha \cdot s \cdot \Delta P_{in} \qquad (1)$$

Here, $\alpha$ is a constant that does not depend on the set flow rate value r and this constant $\alpha$ is inflow characteristic data indicating a relationship between the pressure in the upstream side of the valve 3 and the inflow of the fluid flowing into the internal volume VL including at least the flow path 11 between the flow rate sensor 2 and the valve 3. This inflow characteristic data is previously stored in the inflow characteristic data storage part 45 and this inflow characteristic data is made available for reference by the control coefficient setting part 44.

As to the block diagram of FIG. 4(a), by paying attention to only the influence of the internal volume VL while regarding the disturbance as the input and the actual flow rate $Q_{out}$ after the valve as the output, a block diagram as shown in FIG. 5(a) is obtained. Therefore, the transfer function of the decreased amount in flow due to disturbance $\Delta Q_{cl}$ is expressed by Equation 2.

[Equation 2]

$$\Delta Q_{cl} = \alpha \cdot s \cdot \Delta P_{in} * \frac{\left(\left(-\frac{1}{1+e_1 \cdot s}\right) * \frac{(a_1 \cdot s + 1)}{b_1 \cdot s}\right)}{\left(1 + \left(-\frac{1}{1+e_1 \cdot s}\right) * \frac{(a_1 \cdot s + 1)}{b_1 \cdot s}\right)} \qquad (2)$$

$$= -\frac{\alpha \cdot s}{b_1 \cdot s + 1} \Delta P_{in}$$

Here, $a_1$ and $e_1$ are set to be the same value.

Figure 6A:
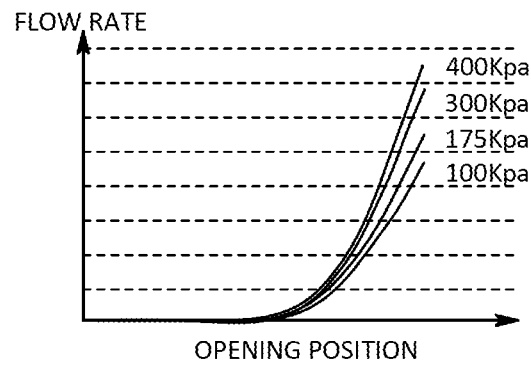
FIG. 6(a), FIG. 6(b) and FIG. 6(c) are schematic graphs showing a feature of a differential pressure flow rate characteristic of a valve in the same embodiment.
Figure 6B:
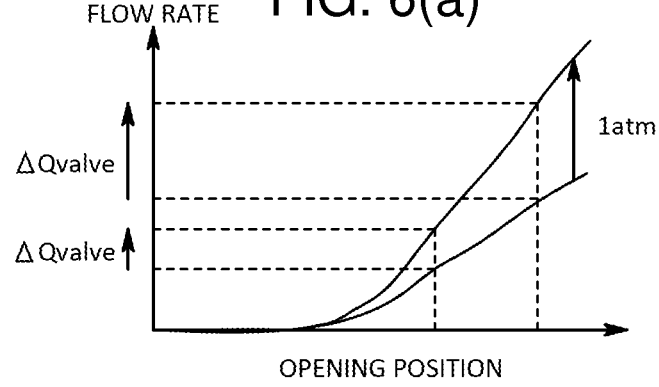
Figure 6C:
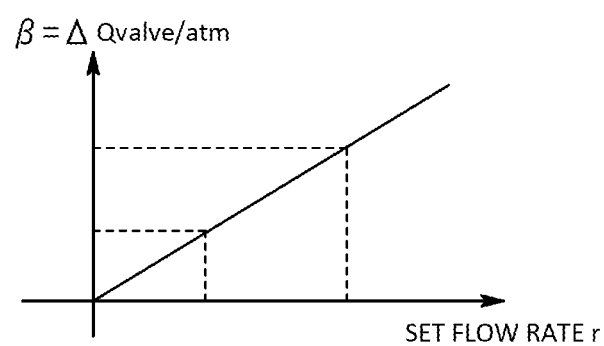

Meanwhile, regarding the valve flow rate characteristic that is a relationship between a flow rate and an opening position (applied voltage), as shown in FIG. 6(a), when the pressure is varied, the higher the pressure, the larger flow rate the fluid flows even at the same opening position. As shown in FIG. 6(b), the increased amount in flow due to disturbance $\Delta Q_{valve}$ corresponds to a flow rate increased by the pressure rise due to disturbance $\Delta P_{in}$ in the case of the same opening position. Based on this FIG. 6(b), when plotting on a graph the increased amount in flow due to disturbance $\Delta Q_{valve}$ in the case where the pressure rise due to disturbances by 1 atm, i.e., a relationship between an increased amount in flow due to disturbance $\beta$ per a unit pressure rise and the set flow rate value r which corresponds to the opening position, there can be obtained an approximately linear relationship as shown in FIG. 6(c), and it becomes possible to be modelled as a control block as shown in FIG. 4(a). Here, an inclination of $\beta$ with respect to the set flow rate value r shown in FIG. 6(c) is created based on a change from a reference pressure $P_{base}$. In the case where the upstream side of the valve 3 is maintained at a pressure higher than the reference pressure $P_{base}$ under a normal condition that there occurs no disturbance, the inclination of $\beta$ with respect to r is decreased, and in the case where the upstream side of the valve 3 is maintained at a pressure lower than the reference pressure $P_{base}$, the inclination of $\beta$ with respect to r is increased. In the present embodiment, since the pressure of the valve 3 is changed on the basis of the reference pressure $P_{base}$, only one graph of FIG. 6(c) is specified and used configured to set the control coefficient.

The relationship between the set flow rate r and the increased amount in flow due to disturbance $\beta$ per a unit pressure rise amount of the pressure in the upstream side of the valve 3 shown in FIG. 6(c) is previously stored in the valve flow rate characteristic storage part 46 as the valve flow rate characteristic data, and this data is available for reference by the control coefficient setting part 44.

Then, since the increased amount in flow due to disturbance $\Delta Q_{valve}$ at that time can be obtained by multiplying $\beta$ determined every set flow rate value r by the pressure rise due to disturbance $\Delta P_{in}$, the increased amount in flow due to disturbance $\Delta Q_{valve}$ can be expressed by Equation 3.

[Equation 3]

$$\Delta Q_{valve} = \beta \Delta P_{in} \qquad (3)$$

Then, as to the block diagram of FIG. 4(a), by paying attention to only the influence of the change of the valve flow rate characteristic caused by the pressure rise due to disturbance $\Delta P_{in}$ while regarding the disturbance as the input and the actual flow rate $Q_{out}$ after the valve as the output, a block diagram as shown in FIG. 5(b) is obtained. Therefore, the increased amount in flow due to disturbance $\Delta Q_{valve}$ is expressed by Equation 4.

[Equation 4]

$$\Delta Q_{valve} = \beta \Delta P_{in} * 1 \Big/ \left(1 - \left(-\frac{1}{1+e_1 \cdot s}\right) * \frac{(a_1 \cdot s + 1)}{b_1 \cdot s}\right) \qquad (4)$$

$$= \frac{\beta \cdot b_1 \cdot s}{b_1 \cdot s + 1} \Delta P_{in}$$

Based on these Equations, the control coefficient setting part 44 sets the control coefficient so as to balance the increased amount in flow due to disturbance $\Delta Q_{valve}$ expressed by Equation 4 and the decreased amount in flow due to disturbance $\Delta Q_{cl}$ expressed by Equation 2.

Specifically, Equation 5 is obtained.

[Equation 5]

$$\Delta Q_{cl} + \Delta Q_{valve} = -\frac{\alpha \cdot s}{b_1 \cdot s + 1} \Delta P_{in} + \frac{\beta \cdot b_1 \cdot s}{b_1 \cdot s + 1} \Delta P_{in} = 0 \quad (5)$$

By solving this equation, Equation 6 is obtained and the control coefficient $b_1$ can be determined so as to prevent the pressure fluctuation in the upstream side of the valve 3 from appearing in the actual flow rate $Q_{out}$ after the valve at all.

[Equation 6]

$$b_1 = \frac{\alpha}{\beta} \quad (6)$$

Figure 7A:
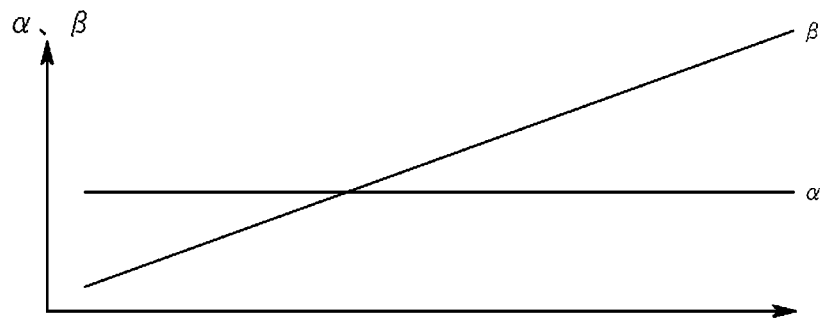
FIG. 7(a), FIG. 7(b) and FIG. 7(c) are schematic graphs showing a trend of parameters and control coefficients in the same embodiment.
Figure 7B:
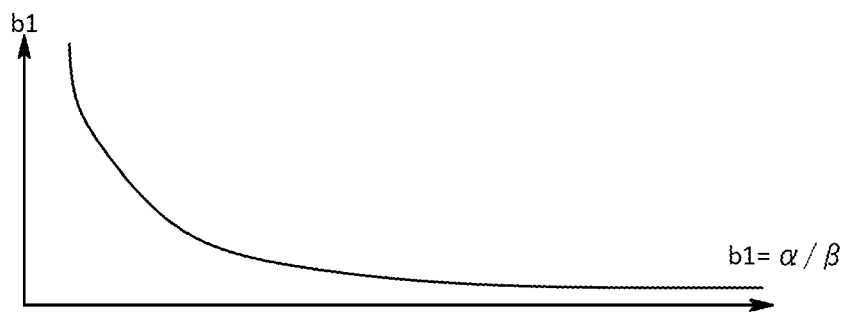
Figure 7C:
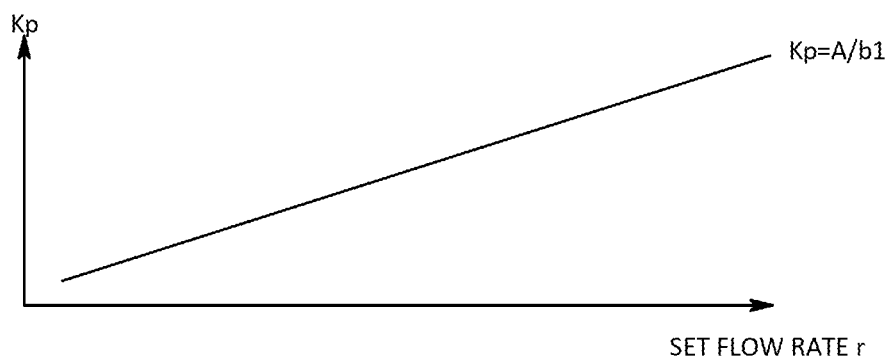

Thus, the control coefficient setting part 44 sets $b_1$ which is one of the control coefficients of the valve control part 41 using α and β. As shown in FIG. 7(*a*), α takes a constant value for the set flow rate value r, and β is a variable which becomes larger as the set flow rate value r becomes larger. Therefore, as shown in FIG. 7(*b*), the control coefficient $b_1$ can be set so as to be substantially inversely proportional to the set flow rate value r.

Further, the control coefficient $b_1$ is in a relationship of being equal to a value obtained by multiplying a reciprocal of a proportional gain Kp in the PID control by a constant. Therefore, it is found that the proportional gain Kp may be merely set so as to be increased in proportional to the set flow rate value r as shown in FIG. 7(*c*).

Thus, in the flow rate control apparatus 100 of the present embodiment, since it is configured that the control coefficient setting part 44 sets $b_1$ and the proportional gain Kp so that the increased amount in flow due to disturbance $\Delta Q_{valve}$ due to a pressure rise in the upstream side of the valve 3 and the decreased amount in flow due to disturbance $\Delta Q_{cl}$ are balanced and offset, it is possible to prevent the influence of the pressure fluctuation from appearing in the actual flow rate $Q_{out}$ after the valve.

That is, by setting the control coefficient as described above, the transfer function from the pressure fluctuation in the upstream side of the valve 3 to the flow rate in the downstream side of the valve 3 is made substantially zero in the feedback control system to thereby make it possible to cancel the influence of the pressure disturbance. Thus, the flow rate in the downstream side of the valve 3 can be made stable substantially constantly at the set flow rate value r.

Moreover, since the pressure disturbance is prevented from appearing by using the characteristics of the feedback control system per se, there is no need to detect the pressure disturbance in the flow rate control apparatus 100 of the present embodiment. Therefore, in the case where the pressure in the upstream side of the valve 3 is substantially kept based on only the reference pressure $P_{base}$ under a condition of no disturbance occurrence, a robust flow rate control can be realized against the disturbance without providing an additional sensor for detecting a disturbance as in the conventional device.

Other embodiments will be described.

In order to set a control coefficient so as to be able to fully exhibit a flow rate control capability of the above embodiment even in the case where the kind of the fluid flowing through the flow path is changed, it may be configured that the control coefficient setting part corrects the control coefficient on the basis of the molar specific heat of the fluid species. More specifically, there has been already known a control coefficient $b_1$ to be determined as to, for example, inert gas such as nitrogen or helium, and in the case where other kinds of fluid flows, the control coefficient can be corrected to $b_1$ appropriate to the fluid species by multiplying $b_1$ by a ratio of a molar specific heat of each of the fluid species. Note that, there is a tendency that the influence of the pressure fluctuation of the valve is less affected as the higher molar specific heat the fluid has.

In the above embodiment, although it is configured that the decreased amount in flow due to disturbance and the increased amount in flow due to disturbance are offset by setting the gain $b_1$ or proportional gain $K_p$ for the PID control as the control coefficient, the offset may be performed by setting other control coefficients appropriately.

Regarding the control coefficient to be set, it may be appropriately calculated using α and β described above, or previously preparing, for example, in a table format, a relationship between the set flow rate values and the gains for offsetting between the decreased amount in flow due to disturbance and the increased amount in flow due to disturbance, and the control coefficient setting part may be configured so as to set the control coefficient of the valve control part by referring to this table.

In the above embodiment, although a thermal flow rate sensor is used as the flow rate sensor, other types flow rate sensors using other measurement principles may be available. Specifically, a pressure type flow rate sensor may be used.

Figure 8:
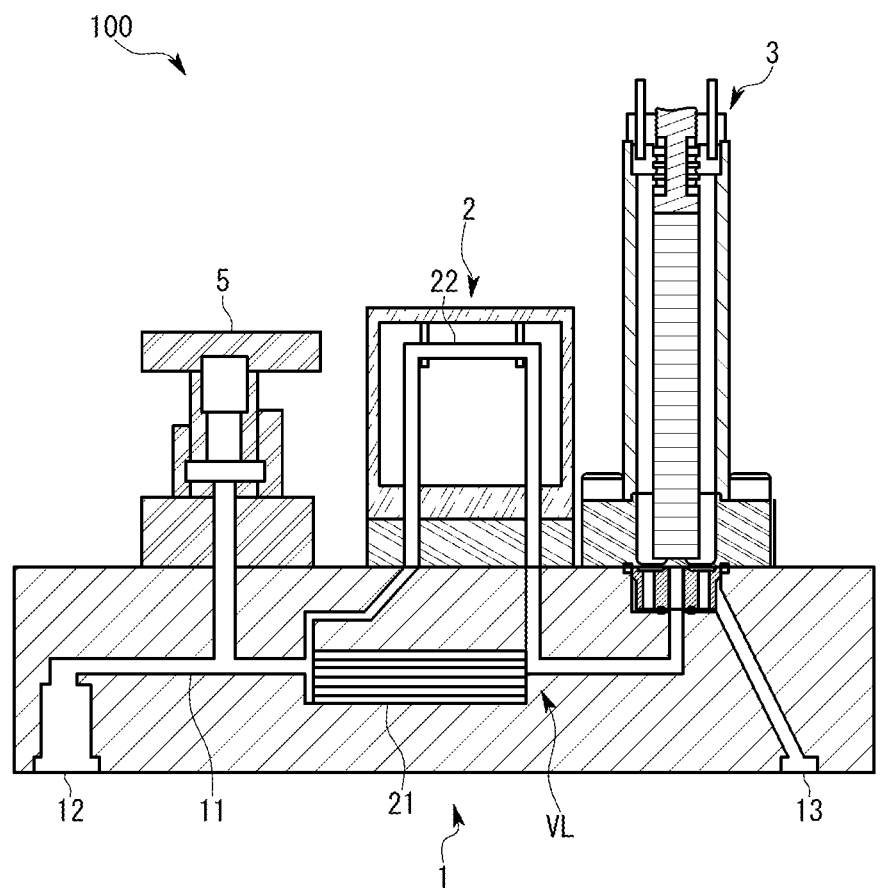
FIG. 8 is a schematic sectional view showing a configuration of a flow rate control apparatus according to another embodiment of the present invention.

In the above embodiment, although the control coefficient for use in the valve control part is appropriately set every set flow rate value by the control coefficient setting part, the control coefficient may be fixed by omitting the control coefficient setting part in a usage such that the flow rate control is performed only at, e.g., a predetermined constant set flow rate value. Further, the control coefficient setting part may be configured to set the control coefficient on the basis of not only the set flow rate value but also the pressure of the fluid flowing through the flow path so that the increased amount in flow due to disturbance and the decreased amount in flow due to disturbance are substantially balanced. More specifically, even in the case where the pressure in the upstream side of the valve 3 is changed to be kept from the reference pressure $P_{base}$ to other pressure even in the no disturbance condition and the inclination of β with respect to the set flow rate value r is changed, in order to balance the increased amount in flow due to disturbance and the decreased amount in flow due to disturbance, it may be configured that, as shown in FIG. 8, a pressure sensor 5 is previously provided on the upstream side of the valve 3 and the control coefficient setting part 44 changes β based on the measured pressure value and the set flow rate value and sets the control coefficient such as the proportional gain $K_p$. Further, since β is a value which is varied in accordance with gas species, it may be configured that the control coefficient setting part accepts the gas species and sets the control coefficient corresponding to the gas species. By this arrangement, there can be realized a flow rate control further ensuring capability of dealing with the pressure disturbance.

In the above embodiment, although the control coefficient, the increased amount in flow due to disturbance and the decreased amount in flow due to disturbance are defined on the basis that the pressure in the upstream of the valve rises, it is, of course, also possible to define them on the basis that the disturbance pressure is reduced. In this case, it can be explained that, in the case where there occurs a disturbance pressure reduction in the upstream side of the valve, the control coefficient is a value which is set so that the increased amount in flow due to disturbance which is an increment amount of the flow rate corresponding to the increment amount of the opening position of the valve that is increased by the valve control part in accordance with the decreased amount of the measurement flow rate value due to the disturbance pressure reduction and the decreased amount in flow due to disturbance which is a decreased amount of the flow rate corresponding to the differential pressure decreased amount before and after the valve due to the decreased amount in flow due to disturbance are substantially balanced.

In the above embodiment, although the valve control part is configured to control the flow rate by the PID control, the flow rate may be controlled based on such as I-PD control and other control algorithms. Moreover, in the above embodiment, although the flow rate control is executed on the basis of the QV characteristic of the valve, the valve may be controlled on the basis of, for example, a relationship between the flow rate and the opening position per se of the valve or a relationship between the flow rate and a position of a valve body of the valve. More specifically, it may be configured that the valve is previously equipped with a displacement sensor capable of measuring an opening position of the valve or a position of the valve body and the valve can be controlled by feeding back the output of the displacement sensor. In this case, it is possible to realize a high-speed control by further improvement of the responsibility of the valve.

In order to be able to realize the flow rate control as in the present invention by retrofitting even in an existing flow rate control apparatus, it is merely necessary that a program is installed in the existing flow rate control apparatus using a program storage medium storing, for example, a program for the flow rate control apparatus to thereby exhibit the functions of the valve control part and the control coefficient setting part of the present invention. Note that various kinds of medium such as CD, DVD, HDD, flash memory and the like can be used as the storage medium.

It is needless to say that various combinations and modifications of the embodiments can be made in a range without departing from the spirit thereof.

REFERENCE SIGNS LIST

100: Flow rate control apparatus
1: Body
11: Flow path
2: Flow rate sensor
3: Valve
4: Control mechanism
41: Valve control part
42: PID control part
43: QV characteristic adjustment part
44: Control coefficient setting part
45: Inflow characteristic storage part
46: Valve flow rate characteristic storage part

The invention claimed is:

1. A flow rate control apparatus comprising:
a valve provided on a flow path where fluid flows;
a flow rate sensor provided on an upstream side of the valve in the flow path;
a valve control part configured to control the valve so that a deviation is reduced, based on the deviation and a control coefficient which is set, and the valve control part is configured so as to control an opening position of the valve by a PID control; and
a control coefficient setting part configured to set a control coefficient of the valve control part based on pressure in the upstream side of the valve or a set flow rate value, wherein
the deviation is a difference between the set flow rate value and a measurement flow rate value measured by the flow rate sensor, and
the control coefficient is a value which is set so that, in the case where a pressure rise due to disturbance occurs in the upstream side of the valve, a decreased amount in flow due to disturbance and an increased amount in flow due to disturbance are substantially balanced,
the decreased amount in flow due to disturbance is a decreased amount of a flow rate corresponding to a decreased amount of the opening position of the valve in the case where the pressure rise due to disturbance occurs in the upstream side of the valve, and
the increased amount in flow due to disturbance is an increased amount of a flow rate corresponding to an increased amount of a differential pressure before and after the valve in the case where the pressure rise due to disturbance occurs in the upstream side of the valve, and
the control coefficient setting part is configured so as to set a proportional gain as the control coefficient and configured so as to set the proportional gain larger as the set flow rate value is larger so that the increased amount in flow due to disturbance and the decreased amount in flow due to disturbance are substantially balanced.

2. The flow rate control apparatus according to claim 1 further comprising:
an inflow characteristic storage part configured to store inflow characteristic data indicating a relationship between the pressure in the upstream side of the valve and an inflow of the fluid flowing into an internal volume including at least a flow path between the flow rate sensor and the valve; and
a valve flow rate characteristic storage part configured to store valve flow rate characteristic data indicating a relationship between the set flow rate value and the increased amount in flow due to disturbance per a unit pressure rise amount of the pressure in the upstream side of the valve, wherein
the control coefficient setting part is configured so as to set the control coefficient so that the decreased amount in flow due to disturbance, and the control coefficient and the increased amount in flow due to disturbance are balanced, wherein
the decreased amount in flow due to disturbance is calculated on the basis of the inflow characteristic data, and
the increased amount in flow due to disturbance is calculated on the basis of the valve flow rate characteristic data and the set flow rate value.

3. The flow rate control apparatus according to claim 1, wherein the flow rate sensor is a thermal flow rate sensor.

4. The flow rate control apparatus according to claim 1, wherein the flow rate sensor is a pressure flow rate sensor.

5. The flow rate control apparatus according to claim 1, wherein the control coefficient setting part is configured so as to correct the control coefficient on the basis of molar heat of fluidic species.

6. A method of controlling a flow rate using a flow rate control apparatus which comprises: a valve provided in a flow path where fluid flows; a flow rate sensor provided on an upstream side of the valve in the flow path; and a valve control part configured to control the valve so that a deviation between a set flow rate value and a measurement flow rate value measured by the flow rate sensor is reduced, on the basis of the deviation and a control coefficient which is set, and the valve control part is configured so as to control an opening position of the valve by a PID control, wherein the method includes;

setting the control coefficient so that, in the case where a pressure rise due to disturbance occurs in the upstream side of the valve, a decreased amount in flow due to disturbance and an increased amount in flow due to disturbance are substantially balanced;

the decreased amount in flow due to disturbance is a decreased amount of a flow rate corresponding to a decreased amount of the opening position of the valve in the case where the pressure rise due to disturbance occurs in the upstream side of the valve, and the increased amount in flow due to disturbance is an increased amount of a flow rate corresponding to an increased amount of a differential pressure before and after the valve in the case where the pressure rise due to disturbance occurs in the upstream side of the valve, wherein a proportional gain as the control coefficient is set larger as the set flow rate value is larger so that the increased amount in flow due to disturbance and the decreased amount in flow due to disturbance are substantially balanced.

7. A flow rate control apparatus comprising:

a valve provided on a flow path where fluid flows;

a flow rate sensor provided on an upstream side of the valve in the flow path;

a valve control part configured to control the valve so that a deviation is reduced, based on the deviation and a control coefficient which is set; and a control coefficient setting part configured to set a control coefficient of the valve control part based on pressure in the upstream side of the valve or a set flow rate value and, wherein the deviation is a difference between the set flow rate value and a measurement flow rate value measured by the flow rate sensor, and the control coefficient is a value which is set so that, in the case where a pressure rise due to disturbance occurs in the upstream side of the valve, a decreased amount in flow due to disturbance and an increased amount in flow due to disturbance are substantially balanced, the decreased amount in flow due to disturbance is a decreased amount of a flow rate corresponding to a decreased amount of an opening position of the valve in the case where the pressure rise due to disturbance occurs in the upstream side of the valve, and the increased amount in flow due to disturbance is an increased amount of a flow rate corresponding to an increased amount of a differential pressure before and after the valve in the case where the pressure rise due to disturbance occurs in the upstream side of the valve, and the control coefficient setting part is configured so as to set the control coefficient and configured so as to set the control coefficient larger as the set flow rate value is larger so that the increased amount in flow due to disturbance and the decreased amount in flow due to disturbance are substantially balanced.

* * * * *